Figure 1:
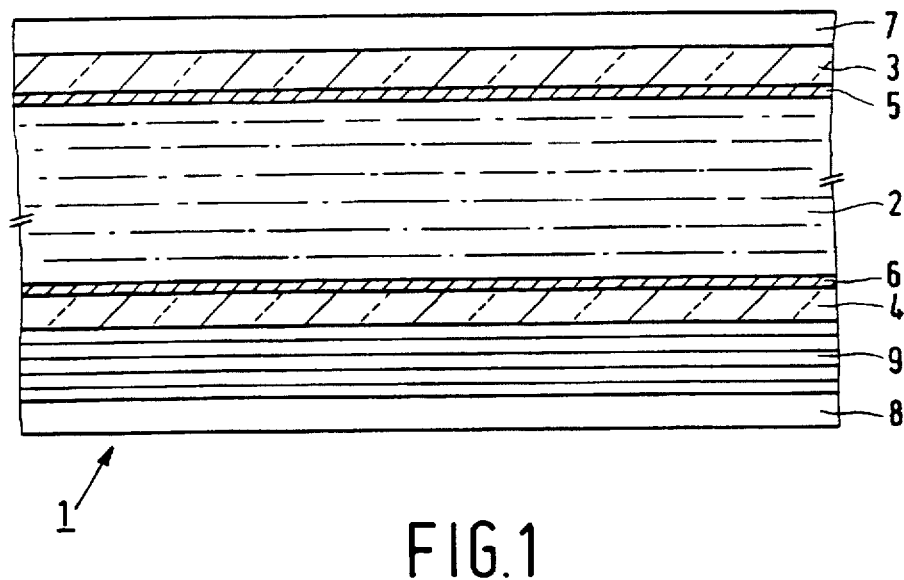

United States Patent
Van Haaren et al.

[11] Patent Number: 5,798,808
[45] Date of Patent: Aug. 25, 1998

[54] LIQUID CRYSTAL DISPLAY DEVICE HAVING A CHOLESTERIC ORDER WITH A PITCH OF HELIX LESS THAN 0.25 MICRONS AND A RETARDATION FOIL

[75] Inventors: Johannes A. M. M. Van Haaren; Dirk J. Broer; Frans Leenhouts, all of Eindhoven, Netherlands

[73] Assignee: U.S. Philips Corporation, New York, N.Y.

[21] Appl. No.: 791,087

[22] Filed: Jan. 29, 1997

Related U.S. Application Data

[63] Continuation of Ser. No. 516,805, Aug. 18, 1995, abandoned.

[30] Foreign Application Priority Data

Aug. 23, 1994 [EP] European Pat. Off. ............ 94202401

[51] Int. Cl.⁶ .................................................. G02F 1/13
[52] U.S. Cl. ........................... 349/96; 349/98; 349/117; 349/175; 349/185; 349/181; 257/59; 257/72
[58] Field of Search ............................. 359/63, 65, 73, 359/93, 101, 105; 349/96, 98, 117, 175, 185, 181

[56] References Cited

U.S. PATENT DOCUMENTS

| | | | |
|---|---|---|---|
| 5,210,630 | 5/1993 | Heynderickx et al. | 359/106 |
| 5,295,009 | 3/1994 | Barnik et al. | 359/65 |
| 5,506,704 | 4/1996 | Broer et al. | 359/63 |

FOREIGN PATENT DOCUMENTS

0576931A2  1/1994  European Pat. Off.

*Primary Examiner*—Tom Thomas
*Assistant Examiner*—Fetsum Abraham
*Attorney, Agent, or Firm*—Norman N. Spain

[57] ABSTRACT

In a liquid crystal display device the number of grey levels is increased by means of a compensation foil comprising a layer having a cholesteric ordering with a helix pattern, in which the pitch of the helix is smaller than $(0.26-0.31.\Delta n)$ μm, in which $\Delta n$ is the optical anisotropy of the anisotropic layer. Moreover, the viewing angle dependence will be more symmetrical by patterning the cholesteric ordering.

15 Claims, 4 Drawing Sheets

LIQUID CRYSTAL DISPLAY DEVICE HAVING A CHOLESTERIC ORDER WITH A PITCH OF HELIX LESS THAN 0.25 MICRONS AND A RETARDATION FOIL

This is a continuation of application Ser. No. 08/516,805, filed Aug. 18, 1995 now abandoned.

The invention relates to a liquid crystal display device comprising a liquid crystal display cell with a liquid crystal material which is present between two substrates provided with electrodes, and polarizers and at least an optically anisotropic layer of a polymer material between the polarizers, said material having a cholesteric ordering with a helix pattern on at least a part of the surface of the layer.

The invention also relates to a retardation foil for use in liquid crystal display devices and to a method of manufacturing such a foil.

Said display devices are generally used in, for example monitors, TV applications and display devices in motorcars and instruments. The foils may also be used in, for example optical components such as light switches having a small angle dependence, as are used, for example in fibre optics.

A display device of the type described in the opening paragraph is known from U.S. Pat. No. 5,210,630. In this display device a compensation foil consisting of an optically anisotropic layer of a polymer material having a cholesteric ordering is used to inhibit discoloration in a twisted-nematic display device and to obtain a high contrast. The polymer material is ordered in such a way that a molecular helix can be distinguished, with the axis of the helix being directed transversely to the layer.

Display devices equipped with such compensation foils still pass considerable quantities of light between crossed polarizers (normally white) in the black state and at given angles. Consequently, such a device still has a given angle dependence, i.e. the contrast is very much dependent on the angle at which and the direction from which the display device is being watched.

It is an object of the invention to provide a display device of the type described above, in which the number of grey levels which can be distinguished is increased considerably. It is a further object to provide a (retardation) foil which can be used in such display devices.

To this end, a display device according to the invention is characterized in hat the pitch of the helix is smaller than 0.25 μm and, more particularly, the pitch of the helix is smaller than $(0.26-0.31.\Delta n)$ μm, in which $\Delta n$ is the optical anisotropy of the anisotropic layer.

The invention is based on the recognition that in practice polarized light is subjected to variations of the state of polarization in the anisotropic layer due to the cholesteric character of this layer. After the polarized light (polarized in a first direction of polarization by a first polarizer) has traversed this layer, it may comprise components transverse to this direction of polarization, referred to as stray components. Since the polarizer for exiting light (with crossed polarizers) passes light with a direction of polarization transverse to this direction of polarization, there is no full extinction. It has been found that these stray components become smaller when the pitch of the helix in the optically anisotropic layer is reduced. Dependent on the number of grey levels to be realised, requirements can then be imposed on the maximum admissible stray components and hence on the maximum pitch of the helix.

It has also been found that the maximum admissible pitch is dependent on the value of the birefringence or optical anisotropy of the anisotropic layer. At a small birefringence, the pitch may be larger, which is expressed by the above-mentioned formula p $<(0.26-0.31.\Delta n)$ μm, in which p is the pitch of the helix n is preferably larger than 0.04.

To prevent discoloration, μn is chosen to be smaller than 0.3 and preferably smaller than 0.2, with a maximum pitch of 0.19 μm ensuring a minimum number of approximately 30 grey levels.

A further embodiment of a display device according to the invention is characterized in that, viewed transversely to the substrates, the director profile in the optically anisotropic layer has a non-rotationally symmetrical pattern. In this connection, "director profile in the optically anisotropic layer" is understood to mean the director pattern across a thickness of at least a full pitch of the molecular helix. In this connection, a "non-rotationally symmetrical" pattern is understood to mean a pattern which does not exhibit any rotational symmetry but may be symmetrical with respect to an arbitrary axis. The director profile in at least a part of the optically anisotropic layer is preferably provided at an angle with respect to the substrates, for example by giving the optically anisotropic layer a sawtooth structure on at least one of its boundary surfaces. In such a device, the angle dependence is reduced. The angle dependence may also be reduced by giving the anisotropic layer of polymer material a cholesteric ordering with a helix pattern on a part of the surface of the layer.

A retardation foil according to the invention, comprising an optically anisotropic layer of a polymer material having a cholesteric ordering with a helix pattern on at least a part of the surface of the layer is characterized in that the pitch of the helix is smaller than 0.25 μm, or smaller than $(0.26-0.31.\Delta n)$ μm, in which $\Delta n$ is the optical anisotropy of the anisotropic layer.

According to the invention, a method of manufacturing a retardation foil is characterized in that a mixture comprising a reactive cholesteric liquid crystal material and a non-reactive cholesteric liquid crystal material having the same rotation is provided on a substrate and the mixture is irradiated with actinic radiation.

These and other aspects of the invention will be apparent from and elucidated with reference to the embodiments described hereinafter.

Figure 6:
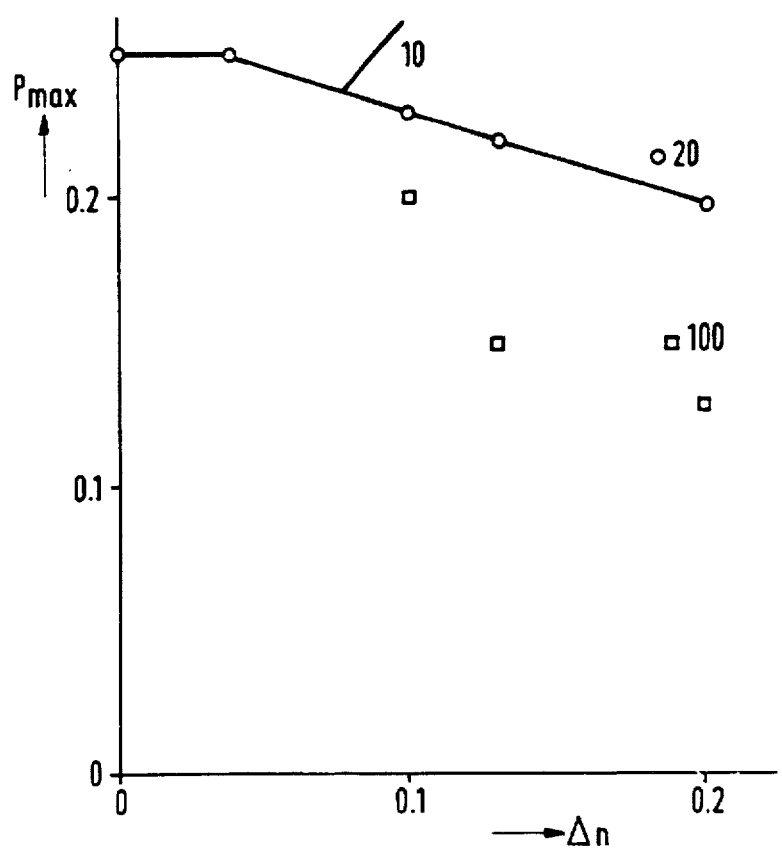
Figure 7:
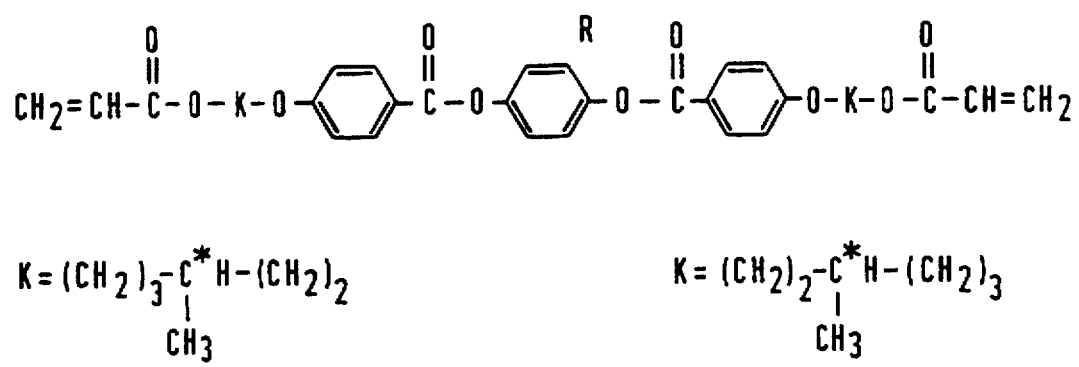
Figure 8:
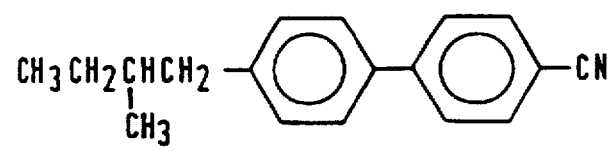

In the drawings:

FIG. 1 is a diagrammatic cross-section of a part of a liquid crystal display device according to the invention, FIGS. 2, 3, 4 and 5 show the maximum values of stray components of transmitted light upon variation of the polar angle θ for display devices in which different foils are used, FIG. 6 shows the maximum admissible pitch as a function of the optical anisotropy of the foil, while FIG. 7 shows the structure formula of a liquid crystal composition as used in such a foil, and FIG. 8 shows the structure formula of a non-reactive liquid crystal composition, as may be used for manufacturing such a foil.

FIG. 1 is a diagrammatic cross-section of a part of a liquid crystal display device comprising a liquid crystal cell 1 with a twisted-nematic liquid crystal material 2 which is present between two substrates 3, 4 of, for example glass, provided with electrodes 5, 6. The device further comprises two polarizers 7, 8 whose direction of polarization is mutually crossed perpendicularly. The device further comprises orientation layers (not shown) which orient the liquid crystal material on the inner walls of the substrates, in this example in the direction of the axes of polarization of the polarizers so that the cell has a twist angle of 90°. In this case, the liquid crystal material has a positive optical anisotropy and a positive dielectric anisotropy. If the electrodes 5, 6 are energized by an electric voltage, the molecules and hence the directors are directed towards the field. The device further comprises a compensation foil 9 consisting of an optically anisotropic layer of polymer material with a cholesteric ordering. The polymer material is ordered in such a way that a molecular helix can be distinguished, with the axis of the helix being directed transversely to the layer.

FIGS. 2, 3, 4 and 5 show the maximum values of the above-mentioned stray components $t_{\pi\delta}$ and $t_{\delta\pi}$ for different foils 9 upon variation of the polar angle θ, i.e. the viewing angle (FIG. 1a) as a function of the pitch of the helix of the polymer material with the cholesteric ordering. The angle dependencies have been computed for different values of the polar angle θ. The maximum values of the above-mentioned stray components $t_{\pi\delta}$ and $t_{\delta\pi}$ upon variation of the azimuth angle are equal. The component $t_{\pi\delta}$ represents the amplitude coefficient in the form of stray light exiting as σ-light which was originally polarized in the π direction transverse thereto, and vice versa. The foils have different thicknesses d while the ordinary and extraordinary refractive indices $n_o$ and $n_c$ are also shown for the material used.

The values shown apply to a wavelength of 500 nm. To be able to realise 20 grey levels for the entire visible range, the requirement holds that $t_{\pi\delta}<0.07$. To be able to realise 100 grey levels, the requirement holds that $t_{\pi\delta}<0.03$. These requirements are based on the following considerations. The relative luminance $Y/Y_{ref}$ is given by $Y/Y_{ref}=(t_{\pi\delta})^2$. A "psychometric lightness" $L=900/Y_{ref}$ is associated with a given relative luminance.

The number of grey levels is then (100/L).

The resultant conditions are shown in the Table below.

| $n_e$ | $n_o$ | thickness (μm) | maximum pitch (μm) at 20 grey levels | maximum pitch (μm) at 100 grey levels |
|---|---|---|---|---|
| 1.74 | 1.54 | 3.6 | 0.20 | 0.13 |
| 1.67 | 1.54 | 5.0 | 0.22 | 0.15 |
| 1.64 | 1.54 | 6.5 | 0.23 | 0.20 |
| 1.53 | 1.49 | 16.0 | 0.25 | 0.25 |

FIG. 6 shows the maximum pitch, as given in the Table as a function of $\Delta n=n_c-n_o$. To be able to display at least 20 grey levels, the maximum pitch should be below the line 10 defined by $p=(0.26-0.31.\Delta n)$ μm.

Figure 2:
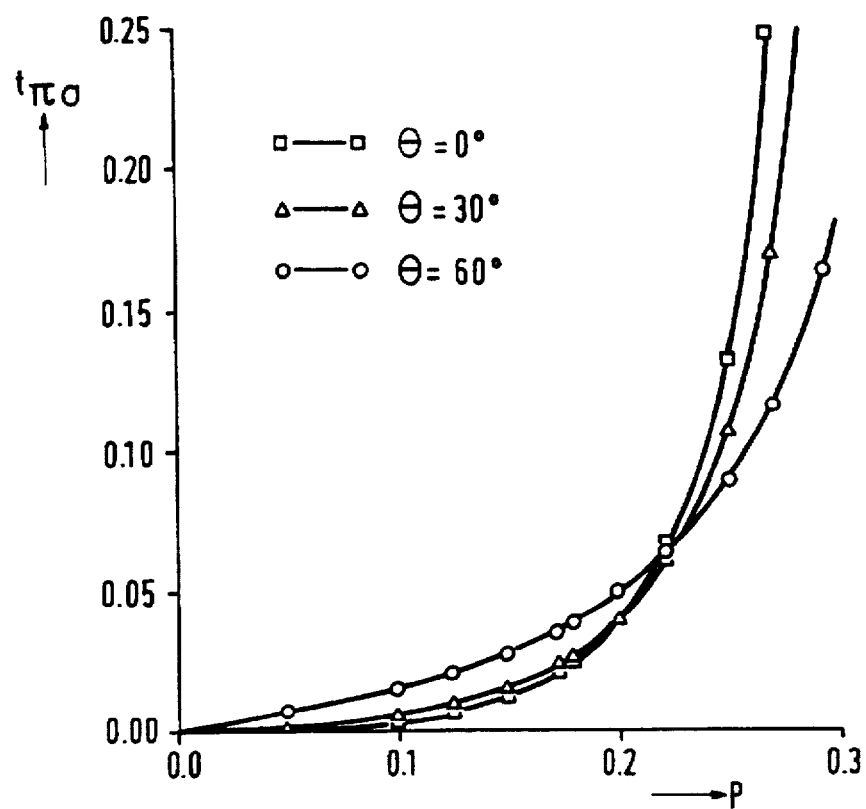
Figure 3:
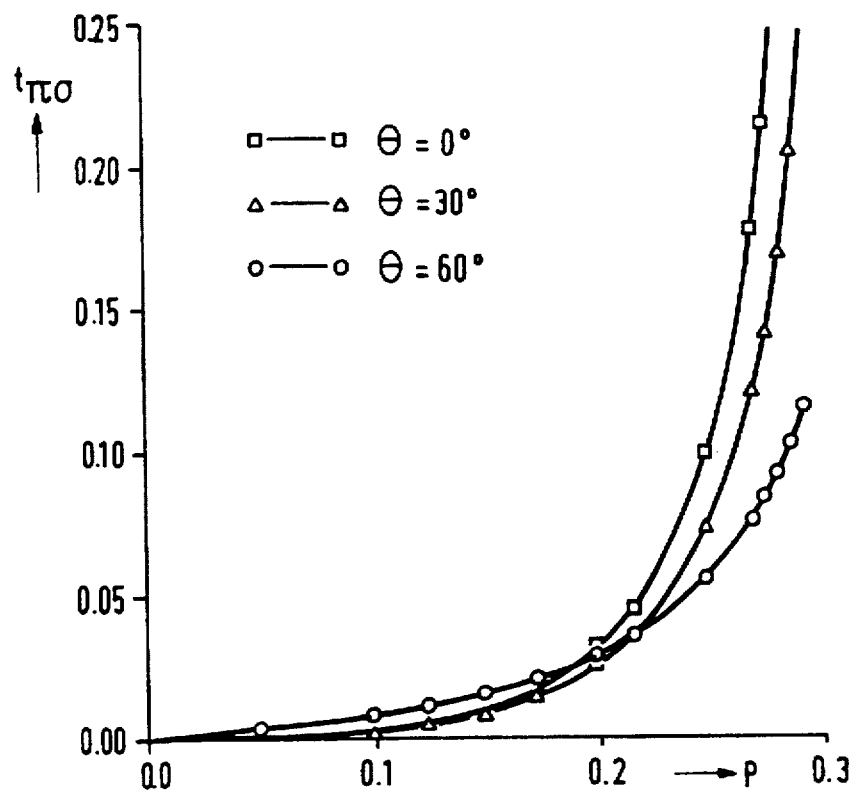
Figure 4:
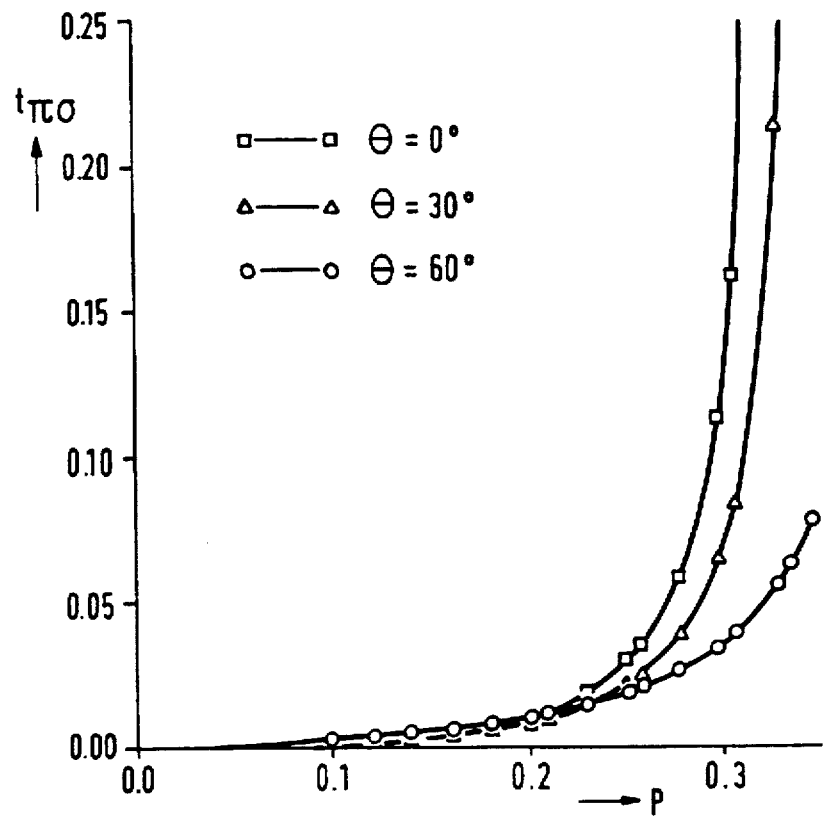
Figure 5:
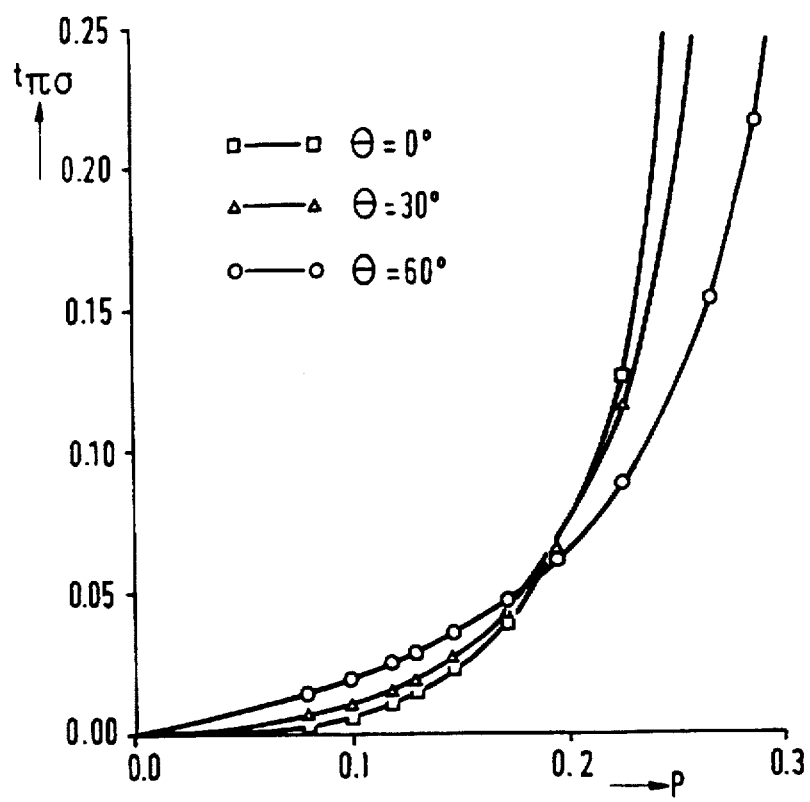

The compensation or retardation foil 9 may be provided separately or directly on the substrate 4 by in situ photopolymerization of a reactive cholesteric liquid crystal. The starting material is a monomer having the structure as shown in FIG. 6 and being possibly provided with a chiral dopant as is shown in FIG. 7. In the monomer state, this material has a stable cholesteric phase between 69° and 97° C. and is provided, for example as a film on a glass or synthetic material substrate and subsequently polymerized via actinic (UV) radiation. After polymerization, the cholesteric ordering is maintained and the high cross-linkage of the structure results in a substantially temperature-independent behaviour. The pitch of the helix after polymerization is 0.18 μm, while the refractive indices substantially correspond to those shown in FIG. 2. FIG. 2 shows that approximately 70 grey levels can be realised with a cell provided with this foil.

A smaller pitch (and hence a display device with more grey levels) can be obtained by mixing the reactive cholesteric liquid crystal with a non-reactive cholesteric liquid crystal having the same sense of rotation and by providing a layer of this mixture as a thin film on a substrate. The mixture acquires a pitch which deviates from that of the two liquid crystals and will usually have an intermediate value. Upon a subsequent radiation with ultraviolet light (actinic radiation), the reactive part of the mixture polymerizes, while the non-reactive part is dissolved in the layer. Since the layer shrinks during polymerization, a layer having a pitch which is lower than that in the original mixture is obtained. In this way, a layer can be obtained with a pitch of the cholesteric helix which is smaller than that obtained by means of the method described in U.S. Pat. No. 5,210,630.

When the non-reactive liquid crystal is subsequently removed from the layer (by evaporation, extraction or in another way) the layer thickness surprisingly decreases proportionally to the content of the non-reactive liquid crystal in the layer, whereas the molecular angle of rotation does not change, in other words, the pitch of the molecular helix further decreases.

Example 1: A 5.4 μm thick monomer film was provided on a unidirectionally rubbed polyimide substrate at 80° C., which film consisted of:

98 parts by weight of reactive cholesteric liquid crystal according to FIG. 7

2 parts by weight of photo-initiator 100 ppm p-methoxyphenol

The layer was irradiated with radiation of 365 nm in a nitrogen atmosphere for 5 minutes, at which the layer acquired a thickness of 5 μm. Via spectral measurement and SEM measurements on a fracture face in which the cholesteric layers can be recognized, the pitch of the molecular helix was found to be approximately 0.18 μm. As may also be apparent from FIG. 2, approximately 70 grey levels can be realised in a device as shown in FIG. 1 in which this layer is used as a compensating layer.

Example 2: A 7.4 μm thick layer was provided on a polycarbonate foil free from birefringence such as cellulose nitrate and provided with a unidirectionally rubbed polyimide substrate at 60° C., which layer consisted of:

70 parts by weight of reactive cholesteric liquid crystal according to FIG. 7

28 parts by weight of cholesteric liquid crystal according to FIG. 8

100 ppm p-methoxyphenol

The layer was irradiated with radiation of 365 nm in a nitrogen atmosphere for 5 minutes, at which the layer acquired a thickness of 7.1 μm. Via spectral measurement at 281 nm, the pitch of the molecular helix was found to be approximately 0.17 μm. Subsequently, the layer was immersed in ethanol for 24 hours, so that the non-reactive cholesteric liquid crystal was extracted from the layer. The layer thickness consequently became 5 μm, while the pitch of the molecular helix was found to be approximately 0.12 μm. The number of grey levels to be realised in a device according to FIG. 1 was found to be approximately 100.

Although an increase of the number of grey levels in the examples leads to a decrease of the viewing angle dependence, the resultant viewing angle dependence is not axially symmetrical. By providing the compensating layer 9 with a pattern of more active and less active areas, this viewing angle dependence in the areas which are most active (a large number of rotations of the helix within the layer thickness) is compensated by areas providing little compensation. The dimensions of these areas are chosen to be such that they are small with respect to the pixel pitch. In this way, a more symmetrical viewing angle dependence is obtained.

For the manufacture of such a layer, for example a layer of cholesteric material according to example 1 is locally illuminated with UV radiation via a mask having a pattern defining said areas, so that cross-linkage occurs at these areas. Subsequently, the temperature is raised until the material has reached the isotropic phase. Subsequently, the layer is illuminated at areas which have not been illuminated previously so that a state without birefringence is fixed at these areas. Variations, such as defining areas having more than two values of the pitch, are of course possible. The parts with a cholesteric ordering have the compensating effect, while the other parts pass the light without birefringence.

In summary, the invention provides the possibility of increasing the number of grey levels in a liquid crystal display device by using a compensation foil comprising a layer having a cholesteric ordering with a helix pattern, in which the pitch of the helix is smaller than $(0.26-0.31.\Delta n)$ μm, in which $\Delta n$ is the optical anisotropy of the anisotropic layer. Moreover, by patterning the cholesteric ordering, the viewing angle dependence will be more symmetrical.

We claim:

1. A liquid crystal display device comprising a liquid crystal display cell with a liquid crystal material which is present between two substrates provided with electrodes, and polarizers and at least an optically anisotropic layer of a polymer material between the polarizers, said material having a cholesteric ordering with a helix pattern, characterized in that the pitch of the helix is smaller than 0.25 μm.

2. A liquid crystal display device comprising a liquid crystal display cell with a liquid crystal material which is present between two substrates provided with electrodes, and polarizers and at least an optically anisotropic layer of a polymer material between the polarizers, said material having a cholesteric ordering with a helix pattern, characterized in that the pitch of the helix is smaller than $(0.26-0.31.\Delta n)$ μm, in which $\Delta n$ is the optical anisotropy of the anisotropic layer.

3. A display device as claimed in claim 1 or 2, characterized in that $\Delta n$ is smaller than 0.3.

4. A display device as claimed in claim 1 or 2, characterized in that $\Delta n$ is larger than 0.04.

5. A display device as claimed in any one of the preceding claims, characterized in that, viewed transversely to the substrates, the director profile in the optically anisotropic layer has a non-rotationally symmetrical pattern.

6. A display device as claimed in claim 5, characterized in that the director profile in at least a part of the optically anisotropic layer is provided at an angle with respect to the substrates, and the optically anisotropic layer has a sawtooth structure on at least one of its boundary surfaces.

7. A display device as claimed in claim 2, characterized in that $\Delta n$ is smaller than 0.3.

8. A display device as claimed in claim 2, characterized in that $\Delta n$ is larger than 0.04.

9. A display device as claimed in claim 2, characterized in that, viewed transversely to the substrates, the director profile in the optically anisotropic layer has a non-rotationally symmetrical pattern.

10. A retardation foil comprising an optically anisotropic layer of a polymer material having a cholesteric ordering with a helix pattern on at least a part of the surface of the layer, characterized in that the pitch of the helix is smaller than 0.25 μm.

11. A retardation foil comprising an optically anisotropic layer of a polymer material having a cholesteric ordering with a helix pattern on at least a part of the surface of the layer, characterized in that the pitch of the helix is smaller than $(0.26-0.31.\Delta n)$ μm, in which $\Delta n$ is the optical anisotropy of the anisotropic layer.

12. A foil as claimed in claim 10 or 11, characterized in that $\Delta n$ is smaller than 0.3.

13. A foil as claimed in claim 10 or 11, characterized in that $\Delta n$ is larger than 0.04.

14. A foil as claimed in claim 11, characterized in that $\Delta n$ is smaller than 0.3.

15. A foil as claimed in claim 11, characterized in that $\Delta n$ is larger than 0.04.

* * * * *

UNITED STATES PATENT AND TRADEMARK OFFICE
CERTIFICATE OF CORRECTION

PATENT NO. : 5,798,808
DATED : August 25, 1998
INVENTOR(S) : Johannes A.M.M. Van Haaren, Dirk J. Broer

It is certified that error appears in the above-identified patent and that said Letters Patent is hereby corrected as shown below:

Column 1, between lines 7 and 8, insert as a centered heading:
--BACKGROUND OF THE INVENTION--;
between lines 38 and 39, insert as centered heading:
--SUMMARY OF THE INVENTION--;
Column 2, delete lines 40-42 in their entirety;
between lines 42 and 43, insert as a centered heading:
--BRIEF DESCRIPTION OF THE DRAWING--;
between lines 55 and 56, insert as a centered heading:
--DETAILED DESCRIPTION OF THE INVENTION--;
between lines 55 and 56, insert as a new paragraph:
--These and other aspects of the invention will be apparent from and elucidated with reference to the embodiments described hereinafter.--.

UNITED STATES PATENT AND TRADEMARK OFFICE
CERTIFICATE OF CORRECTION

PATENT NO. : 5,798,808
DATED : August 25, 1998
INVENTOR(S) : Johannes A.M.M. Van Haaren, Dirk J. Broer It is certified that error appears in the above-identified patent and that said Letters Patent is hereby corrected as shown below:

IN THE CLAIMS

Claim 3, line 1, delete "or 2".

Claim 4, line 1, delete "or 2".

Claim 5, line 1, delete "any one of the preceding";
line 2, change "claims" to --Claim 1--.

Claim 12, line 1, delete "or 11".

Signed and Sealed this

Twenty-ninth Day of June, 1999

Attest:

Attesting Officer

Q. TODD DICKINSON

Acting Commissioner of Patents and Trademarks